Patented June 19, 1928.

1,674,362

UNITED STATES PATENT OFFICE.

HANS HAHL, OF ELBERFELD, NEAR COLOGNE, GERMANY, ASSIGNOR TO WINTHROP CHEMICAL COMPANY, INC., OF NEW YORK, N. Y.

COMPLEX ANTIMONY COMPOUND.

No Drawing. Application filed March 11, 1926, Serial No. 94,055, and in Germany May 12, 1925.

The present invention concerns the manufacture of complex antimony compounds which are soluble in water. The process consists in the interaction of the antimonyl compounds of such polyphenols as contain two hydroxyl groups in the ortho-position to each other with the neutral salts of mercapto-carboxylic acids.

The products of my invention which thus contain antimony and sulfur are, after being dried and pulverized, whitish powders which are soluble in water with a practically neutral reaction. Their solutions are not precipitated by alkalies, but alkali sulphides produce a precipitate of antimony sulphide.

The new compounds possess outstanding specific properties and are intended to find application in therapy. They are particularly effective in the treatment of trypanosome infections. Their aqueos solutions have no irritating effects.

The following examples will serve to illustrate my invention:—

*Example 1.*—20 parts by weight of thioglycollic acid are, together with 8.7 parts by weight of caustic soda, dissolved in 200 parts of water, 55 parts by weight of antimonyl pyrocatechol (Zentralblatt 1898 II page 598) are added and the mixture is heated for some time. The greater part of the antimonyl pyrocatechol passes into solution, whereupon the liquid is filtered and the filtrate evaporated until crystallization commences. On cooling the sodium salt of antimonyl pyrocatechol thioglycollic acid having most probably the formula

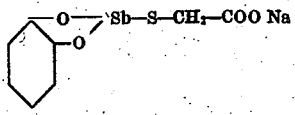

crystallizes out and upon recrystallization from aqueous solution gives a whitish crystalline product, soluble in water with a practically neutral reaction. The aqueous solution is not precipitated by the alkalies but alkali sulphides produce an orange-red precipitate of antimony sulphide. With mineral acids a crystalline precipitate is obtained, presumably consisting of a complex antimony thioglycollic acid, possessing a content of antimony of about 40%.

*Example 2.*—14 parts by weight of thioglycollic acid and 6 parts by weight of caustic soda are dissolved in 250 parts of water and after addition of 40 parts by weight of antimonyl pyrogallol the whole is heated for some time. The greater part of the latter passes into solution, whereupon the liquid is filtered and the filtrate evaporated until crystallization commences. On cooling the complex sodium salt of an antimonyl pyrogallol thioglycollic acid, containing antimony and sulphur, crystallizes completely. On recrystallization from water a colorless crystalline mass is obtained, which is soluble in water with a neutral reaction. The aqueous solution is not precipitated by alkalies, but readily by alkali sulphides. Mineral acids decompose the compound with the formation of a complex antimony thioglycollic acid, possessing an antimony content of 40% and apparently identical with the acid mentioned in Example 1.

*Example 3.*—20 parts by weight of gallic acid, 4.2 parts by weight of caustic soda, 20 parts by weight of antimony trioxide and 200 parts of water are heated together for some time. When the reaction is complete the liquid is filtered and to the filtrate is added a solution of 10 parts by weight of thioglycollic acid and 4.2 parts by weight of caustic soda in 50 parts of water, the whole is then further heated until the odour of thioglycollic acid has completely disappeared. After filtration the filtrate is allowed to run slowly into alcohol, a slightly coloured compound being precipitated thereby, which contains sulphur and antimony. On drying, the compound is easily soluble in water with a practically neutral reaction. Alkalies colour the aqueous solution red but do not cause precipitation. Alkali sulphides precipitate the orange-red antimony sulphide.

If the antimonyl gallic acid, described in Zentralblatt 1898 II page 599, is heated with 1 molecule of neutralized thioglycollic acid in water, the former passes into solution and on evaporation of the subsequently neutralized reaction liquid a compound remains, the properties and antimony content of which are in agreement with those of the above described compound.

I claim:

1. Process for the manufacture of complex antimony compounds which process consists in the interaction of antimonyl compounds of polyphenols containing 2 hydroxyl groups in the ortho-position to each other, with the neutral salts of mercapto carboxylic acid.

2. The new complex antimony compounds of the general formula

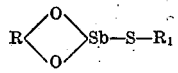

wherein R represents an aryl radicle, and R₁ represents an organic radicle containing a carboxyl group, being generally in the shape of their alkali metal salts whitish crystalline products soluble in water with a practically neutral reaction, their solution not being precipitated by alkalies, but giving a precipitate of antimony sulfide with alkali sulfides, and being useful therapeutic agents.

3. The new complex antimony compound being derived from thioglycollic acid and antimonyl pyrocatechol which in the shape of its sodium salt having most probably the formula:

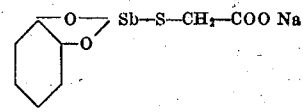

crystallizes from water as a white crystalline compound soluble with a practically neutral reaction, its aqueous solution giving an orange red precipitate of antimony sulfide with alkali sulfide, and being a therapeutically useful agent.

In testimony whereof I have hereunto set my hand.

HANS HAHL.